United States Patent

[11] 3,612,812

[72] Inventors Hans Wacker
Heidelberg;
Erwin Wolfinger, Oberreichenbach uber Calw, both of Germany
[21] Appl. No. 58,616
[22] Filed July 27, 1970
[45] Patented Oct. 12, 1971
[73] Assignee Firma Kettenfabrik Renz, Wacker & Co.
Calmbach, Germany
[32] Priority July 25, 1969
[33] Germany
[31] P 19 37 915.8

[54] MACHINE FOR PRODUCING RESISTANCE WELDED TRIMETALLIC CONTACTS
10 Claims, 8 Drawing Figs.
[52] U.S. Cl. ................................................. 219/107,
29/630 C, 219/79, 219/150
[51] Int. Cl. ................................................. B23k 11/02,
B21j 5/08
[50] Field of Search ................................................. 219/107,
79, 150, 57; 29/630 C; 140/112

[56] References Cited
UNITED STATES PATENTS
| | | | |
|---|---|---|---|
| 3,279,505 | 10/1966 | Renz et al. | 219/57 X |
| 3,514,574 | 5/1970 | Forschler | 219/104 X |
| 1,309,523 | 7/1919 | Hosford | 219/150 R |
| 3,371,414 | 3/1968 | Gwyn, Jr. | 29/630 C |
| 3,311,729 | 3/1967 | Duell, Jr. | 29/630 C |

*Primary Examiner*—J. V. Truhe
*Assistant Examiner*—Hugh D. Jaeger
*Attorneys*—Francis D. Stephens and Hugo Huettig, Jr.

ABSTRACT: A machine for making trimetal contacts having a body of relatively low cost metal, such as copper, and contact surfaces of an expensive metal such as silver, the machine including a plate rotatable in a vertical plane carrying a plurality of matrices spaced equally about its circumference, and means to position each matrix successively to a plurality of work stations, a first work station to receive the end of a copper wire to a predetermined depth in the matrix at that work station, the matrix cooperating with a first stationary guide-forming countershear means through which the copper wire is fed, to shear the end of the copper wire to form the body of a workpiece, and to carry the severed piece to a second work station when the rotatable plate is indexed to the next station where the end of the short workpiece body is contacted by the end of a silver wire in a first welding chamber where an electric welding current is passed through the contacting surfaces to weld the silver wire to the copper workpiece. The silver wire is then advanced until the weld, and a predetermined length of silver wire enters the matrix which cooperates with a second stationary guide-forming countershear means to shear the silver wire adjacent the weld as the matrix is moved to carry the workpiece to the next successive work station where the second end of the copper body of the now bimetal workpiece is contacted by a second silver wire in a welding chamber positioned on the other side of the rotatable plate from said first welding chamber and the silver wire is welded to the copper of the workpiece, the second silver wire is then advanced into the matrix a predetermined distance and the matrix, in cooperation with a third fixed guide, shears the second silver wire as the plate carries the workpiece forward to a final station where the now trimetal workpiece is simultaneously shaped by upsetting, and ejected from the matrix.

INVENTORS
HANS WACKER
ERWIN WOLFINGER

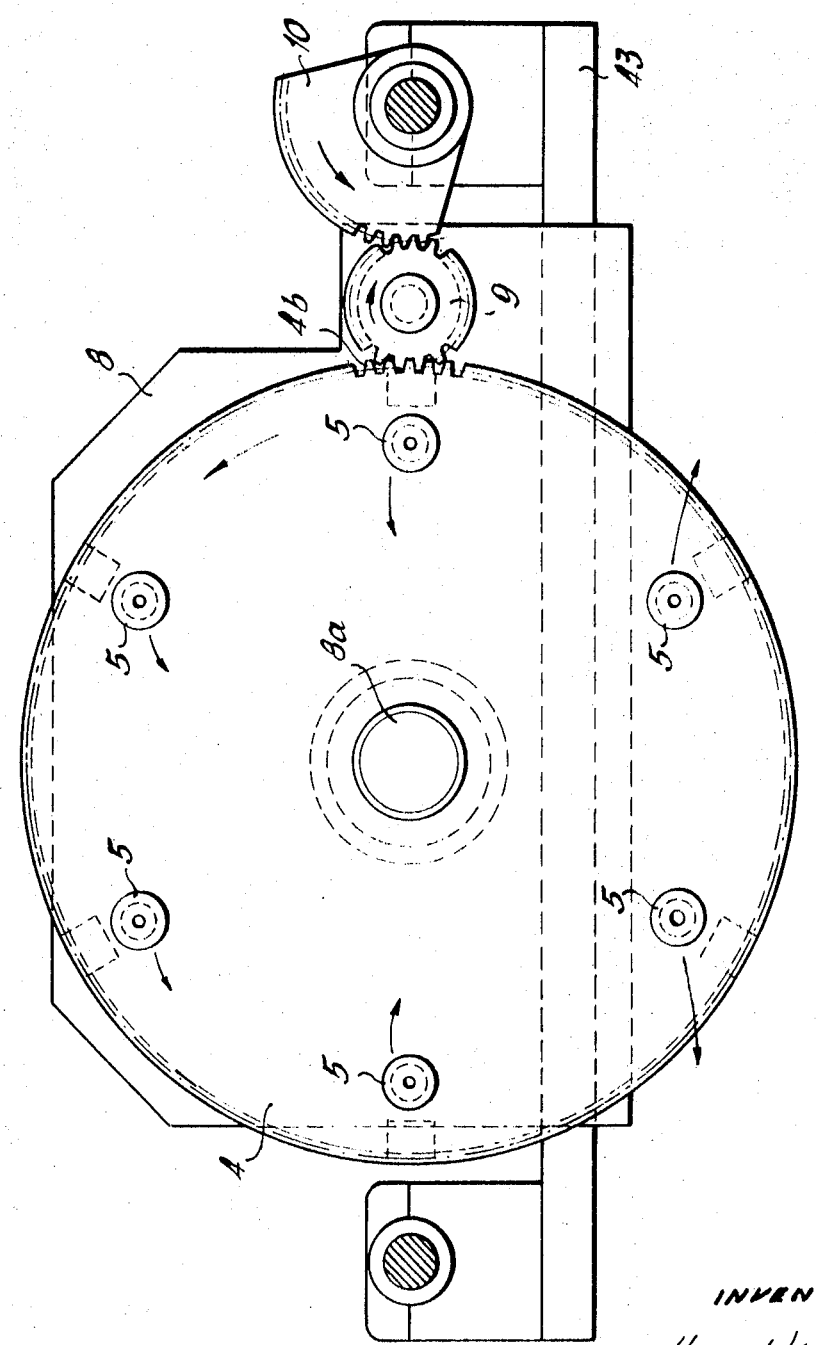

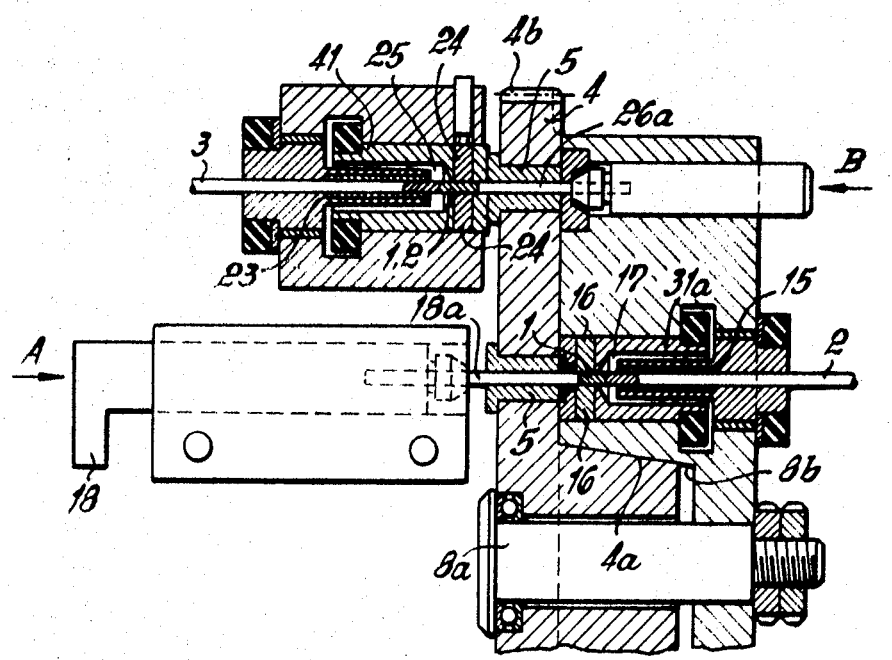
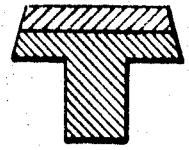
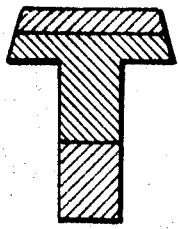
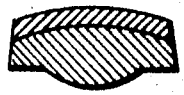

MACHINE FOR PRODUCING RESISTANCE WELDED TRIMETALLIC CONTACTS

The present invention relates to a process and more especially to an apparatus for the production of resistance welded trimetal contacts made of wire of various metals by means of a rotary plate which rotates opposite a succession of working stations and in which shearing matrices are provided about its circumference for the purpose of receiving, shearing, and transporting sections of wire workpieces to successive stations. The present invention has the purpose to combine an essential simplification of the process with a considerable increase in capacity and, in turn, a more economical process in contrast to the old and known methods.

It is known to produce trimetal contacts from plated strip material and bands. Such a strip or band consists, on its upper surface or side, of a layer of precious metal, as a rule silver or a silver alloy, which is either soldered or welded onto a carrier metal, as a rule electrolytic copper, iron or monel, and onto whose underside is also either soldered or welded a layer of precious metal, as a rule silver or a silver alloy. This plated metal strip is fed to a transfer press which cuts trimetal sections from the metal strip and which are then formed into trimetal contacts by passing through a number of various stages or steps. In lieu of the transfer press, it is also known to use a rivet upsetting machine with a rotary table which cuts trimetal sections from the strip and, at the same time, rounds these sections off into a circular form. Subsequently these round shapes are transported by means of the rotary table to the shaping tools where they are shaped into the finished trimetal contacts. These known methods of production and the production apparatus are relatively expensive and their capacity is quite low. This is caused in part by the fact that the plated strips can only be produced at the limited length of approximately two meters. When cutting the initial strip material so that the trimetal contacts can be formed, the known methods produce a considerable amount of waste which can only be used again after the various metals of the strip have been separated. This, however, means an additional expense in the production of such contacts.

The present invention is, therefore, based on the task of finding a process and an apparatus for the execution of said process which avoids the use of plated strips or bands as the workpiece and, thus, avoids the disadvantages of such strips and which makes possible at the same time a high output coupled with a corresponding economy. This task is solved according to the invention in that the process makes use of metal wires as the initial material as well as a rotating plate with shearing matrices for the shearing, receiving, and transporting of the sections of the wire workpiece to the next work station (such as is known from the production of bimetal contacts). The rotating plate includes a plurality of matrices constructed on both sides so that they can shear off sections of wire, the first sheared section of wire that has been received in the first matrix at the first work station is combined with the second wire that is introduced within a first restricted welding chamber in a first welding machine at the second work station. The first welding machine which lies on one side of the matrix butt welds the second wire at the abutting surfaces to the first section of wire. The rotary plate is then further rotated to shear off the now bimetal workpiece and move it to the third work station where a third piece of wire is introduced within a restricted second welding chamber of a second welding machine, which lies opposite the matrix at the third work station on the other side of the rotating plate from said first welding machine where the third piece of wire is butt welded at the abutting surfaces with said bimetal wire workpiece. Following that procedure, the rotary table is further rotated so that the desired length of a now trimetal wire workpiece is sheared off. The trimetal workpiece is then moved to a final work station where it is introduced or fed to shaping tools which are provided at this fourth working station or in one or several subsequent working stations, from whence it is finally transported to an ejection station. The fourth station is preferably both the shaping and the ejecting station. It is possible with this process and with an apparatus operating according to said process, to accomplish the production of trimetal contacts in the same manner as the bimetal contacts from wires of various metals and with the use of a revolving plate. In this manner, it is possible to produce said trimetal contacts cheaply and economically without wastage while at the same time obtaining a high yield of the finished product. The apparatus can, in this instance, be built in such a manner that it is possible to produce not just trimetal contacts but also bimetal contacts and "button" contacts, in other words, it can be used for several purposes.

It is advantageous and preferred that the apparatus for the execution of this process be constructed in such a manner that the axle for the rotating plate is horizontally but not rotatably positioned in a receiver, which is arranged so that it is fixed in a vertical plane, the rotating plate is then also arranged in the vertical plane, and further, the feeder for the first and second wires as well as the first welding tool and the ejector mechanism are arranged on one side of the rotating plate and the feeder of the third wire as well as the second welding mechanism and the final shaping tools are arranged on the other side of the rotating plate. This results in a machine that is especially desirable from the structural point of view, other advantage being the distribution of the tools which is quite favorable for the cycle of operation. The two welding processes take place at the same time, each on a different workpiece, but they can be controlled separately which makes the best welding conditions for each welding station possible.

The rotary plate may comprise a central outer cone which is provided with a bore for the axle which is mounted on the receiver. The outer cone being rotatably positioned in an inner cone in the receiver. The feeder for the first and second wire, the first welding tool and the ejector mechanism as well as the needle attachment for the second welding device are preferably arranged in the receiver. In the known horizontally lying rotary tables, the latter are arranged within a gear wheel which is provided with an inner cone and which, in turn, is rotatable on the outer cone of a stationary receiver. In contrast thereto, it is found that the central outer cone of the rotary plate according to the present invention makes possible a tighter construction. Furthermore, it is possible for the rotary plate to be provided on its circumference with six matrices which are uniformly spaced and four similarly spaced working stations are provided, the shaping tools and the ejector mechanism being at the last working station so that this station and the first three work stations for the feeding of the wire and the welding tools are arranged in the upper half of the vertically disposed rotary plate above the base or frame of the machine. This causes the entire operating procedure to be easily supervized and, the tools being above the frame of the machine, they are easily accessible for repair or replacement.

The completed article made by the machine of the present invention is very small. The problem of holding a minute piece of copper while welding it to even smaller pieces of silver appeared to the art to be unsolvable. The machine of the present invention solves the problem and processes the raw materials, copper and silver wire, into completed minute trimetal contacts with no wastage of material, and no handling of the material during the operation which is entirely automatic.

It is advantageous and preferred that the rotary plate be provided with a gear wheel on its circumference whose drive is accomplished by way of an intermediate pinion and a toothed segment by means of bevel gears situated within the frame of the machine driven from a constant speed rotating power source. The movable slides for feeding the wire are, most appropriately, each arranged within a guide element which has the shape of a frame and is mounted on the base plate or frame of the machine. The guide element has slide rails on both sides to receive the slides.

It is advantageous and preferred that each of the feeding devices for the wires be provided with a wire clutch mechanism which acts to prevent movement of the wire in the direction opposite to the forward feeding direction, and in the case of the feeder for the first wire, when using copper as the material, is advantageously provided with a ball clutch, and the feeders for the second and third wires, when using silver as the material, are each provided with a conical clutch. A ball clutch, when using silver, is not desirable because of the sensitivity of the surface of the precious metal and the danger of deformation; but a ball clutch can be used for copper. The ball clutch is simpler and smaller and, therefore, of a more compact construction. Further, since it has only rotating parts, it is cheaper to manufacture. The cones of a conical clutch have to be ground and polished and are therefore more expensive because of the drilling, slitting and polishing procedures that are necessary.

Each conical wire clutch is appropriately arranged within a slide which is movable and can be slid between the guide rails of the framelike guide element for the wire feeding devices by means of a welding needle pressing on the opposite side of the rotary table against the pressure of an adjustable spring in the slide. The pressure of this spring, in this instance, is to be higher than the holding pressure of the clamping devices of the welding machine.

It is advantageous and preferred that a separate welding chamber be provided within each of the two welding machines for the butt welding of the second and third wires to the section of copper wire. The dimension of these welding chambers between the clamping pieces for the piece of copper wire and the welding jaws for the other piece of wire is to be adjustable to correspond approximately to the diameter of the wire. This procedure results in the best welding conditions. When the diameter of the wire is somewhat smaller, from approximately 1.3 to 1.8 mm., then the distance between the clamping pieces and welding jaws is somewhat larger than the diameter of the wire, and when the diameter of the wire is larger from approximately 2.5 mm. up, it should be somewhat smaller; it is identical when the diameter of the wire is 1.8 to 2.5 mm.

When contacts are to be manufactured in which the diameter of the head that has to be upset is substantially larger than the diameter of the wire, it is advantageous for the preupsetting stamp or press to execute a movement which causes a so-called fluid pressing procedure. This movement is executed in the same direction as the movement of the forward feeding needle but at a slower speed.

It is also advantageous if, following the shaping of the head by means of the gradual fluid pressing process, the final form of the head is obtained by means of a single upsetting stroke of the final pressing stamp.

In a special development of the apparatus to the present invention, it is shown that the control of the supply of current for the electrical resistance welding is accomplished separately by means of the welding tools for each welding station by way of transformers that are connected with the welding tools through flexible electrical cables and by means of a transistorized thyristor control. In this instance, it is possible that the control of the supply of electrical current for the electrical resistance welding through the welding tools is accomplished separately for each welding station by means of a transistorized condenser impulse welding machine control. Finally, it is shown that, for the purpose of starting the welding process, microswitches are used that serve as the initiators of the impulses, and these microswitches are actuated by way of cams, which are arranged on a controlling shaft that acts in unison with the drive of the rotary plate.

The drawings represent an example of construction of the apparatus according to the invention:

FIG. 2 is an elevational view of the rotary plate showing its work stations, as well as its drive shown in schematic representation;

FIG. 3 is a longitudinal section through the first and second welding stations of the rotary plate;

FIGS. 4, 5, 6 and 7 show, each in longitudinal section, bimetal contacts, trimetal contacts and "button" contacts produced with the apparatus according to the invention.

Figure 1A:
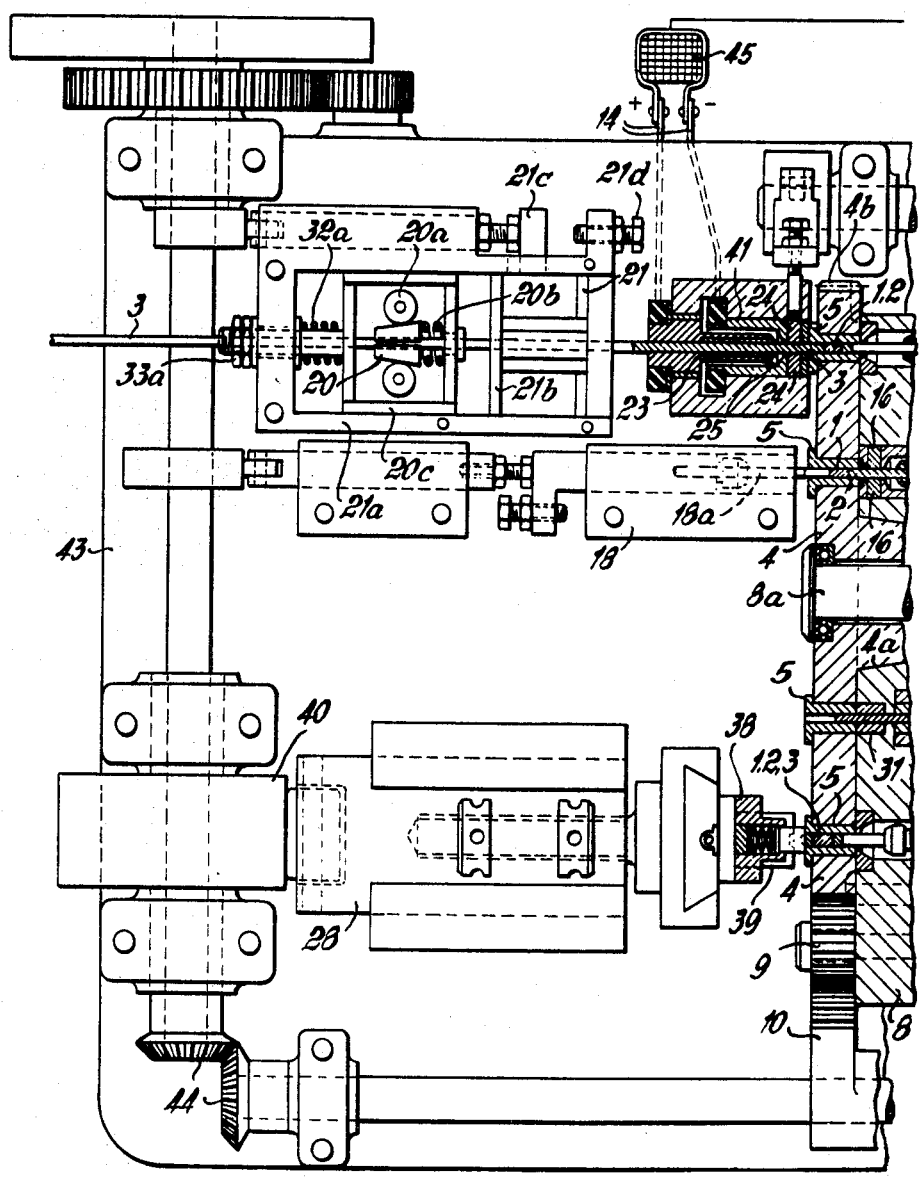
FIGS. 1a and 1b show a top view of the apparatus, partially in section.
Figure 1B:
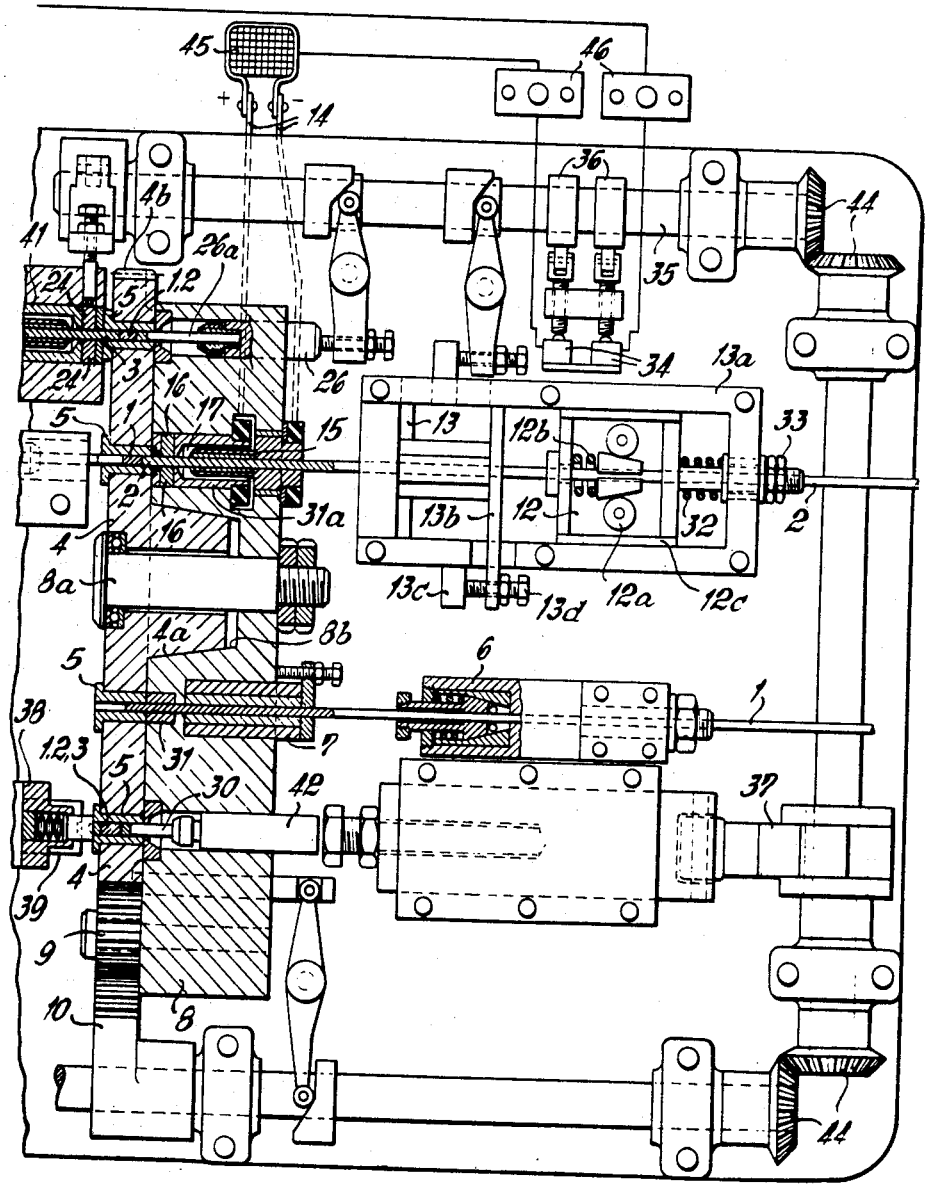

A stationary pin 8a mounted in stationary receiver 8 supports the vertically arranged rotary plate 4. The rotary plate 4 has a central cone 4a which is provided with a bore to receive the pin 8a and is rotatably positioned in a conical recess 8b of the receiver 8. Further, the rotary plate 4 is provided on its circumference with a gearwheel 4b to be driven by means of intermediate pinion 9 and the tooth segment gear 10 so that the plate 4 is rotated intermittently stepwise between periods of dwell. Segment gear 10 is mounted on a shaft rotated by bevel gears 44 which are situated within the frame 43 of the machine. The rotary plate 4 is further provided near its circumference with six matrices 5 which are uniformly distributed thereabout so as to be successively positioned by the intermittent stepwise rotation of plate 4 at six stations I to VI. There will be a dwell of each successive matrix at each station.

On the one side of the rotary plate 4, the feeding devices for the first wire 1 (copper wire) and the second wire 2 (silver wire) are positioned, as well as the first welding tool 31a and the ejector mechanism 42, and on the other side of the rotary table 4 the feeding mechanism for the third wire 3 (silver wire) as well as the second welding tool 41 and the shaping tools 38 and 39 are arranged. The arrangement is, further, made in such a manner that the feeding of the first and second wires 1 and 2, the first welding tool 31a and the ejector mechanism 42 are all installed in the stationary receiver 8. In this instance, the shaping tools 38 and 39 and the ejector mechanism 42 are arranged at the last station VI so that this working station VI and the first three switching stations I,II and III for the feeding of the wires 1, 2, 3 and the welding tools 31a, 41 lie in the upper half of the vertically arranged rotary plate 4 above the base plate of the frame 43 of the machine.

The movable slides 13 and 31 to supply the wires 2 and 3 are arranged within framelike guide members rigidly mounted on the base plate of the frame 43 of the machine. Slide rails 13a are arranged on both sides of slide 13, and slide rails 21a guide slide 21.

The feeder elements for wires 1, 2 and 3 are each provided with a wire clutch 6, 12 or 20 which act to prevent wire movement in the direction opposite to the forward feeding direction. In this particular case, the feeders for the copper wire 1 are provided with a ball clutch 6 and the feeders for the silver wires 2 and 3 with conical clutches 12 and 20, respectively.

Each conical wire clutch 12 or 20 for the silver wire 2 or 3 is arranged with a slide 12c or 20c. These slides are movable between the slide rails 13a or 21a of framelike guide elements for the wire cam operated slides 13 and 21 for the silver wires 2 or 3 in the direction contrary to the wire feeding direction by means of the welding needle 18a or 26a pressing, via the wire workpieces, against the pressure of adjustable spring 32 or 32a. The pressure caused by the adjustable spring 32 or 32a, in this particular instance, must be higher than the holding pressure of the welding clamps 15 and 23 so the wire can slide through the clamps. The conical wire clutches 12 and 20 are provided with adjustable slide rollers 12a or 20a and with a spring 12b or 20b, under pressure, so that it is easier to unfasten the jaws of the cone lock.

The slide 13, which moves the wire, is provided on its front with a cover plate 13b which projects on one side beyond the slide rail 13a. Installed in said cover plate 13b is an adjustable screw stop 13d for the adjustment of the forward feeding of the silver wire 2. This adjustable stop 13d contacts fixed stop 13c which is rigidly installed on one of the slide rails 13a. The wire slide 21 has on its front a cover plate 21b and also on its side a nose or fixed stop 21c which protrudes beyond the slide rails 21a and is used as the stop for the forward feeding of the silver wire 3. The forward feeding of the silver wire 3 is adjusted by means of the adjustable screw stop 21d.

For the purpose of butt welding the silver wires 2 and 3 to the section of copper wire 1 within the two welding tools 31a and 41, separate restricted welding chambers 17 and 25 are provided. The dimension of the welding chamber 17 or 25 between the welding clamps 15 or 23 of the wire 2 or 3, and the welding jaws 16 or 24 of the other wire 1 or 1, 2 can be adjusted to correspond approximately to the diameter of the wire.

When the diameter of the head of the contacts that are to be upset is substantially larger than the diameter of the wire, then the preupsetting stamp 38 executes a gradual movement, under the influence of cam 40, creating a fluid pressing procedure, in the same direction as the forward pushing needle 30. The final form of the head is then obtained by means of a single stroke of the finishing press stamp 39.

The control of the supply of current for the electrical resistance welding through the welding tools 31a and 41 for each welding station, separately, can either be accomplished by way of transformers 45 connected with the aid of flexible cables 14 with the welding tools 31a and 41 by means of a transistorized thyristor control 46 or a transistorized condenser-impulse-welding machine control.

Microswitches 34 are used as the sender of impulses in order to start the welding process, and their actuation is accomplished by means of cams 36 which are arranged on a control shaft 35 that acts in unison with the drive of the rotary plate 4.

Still further particulars of the structure of the apparatus become apparent from the following explanation of the manner of operation of said apparatus.

The wire 1, for instance copper wire, is pushed forward through a wire guide 7 by the ball wire clutch 6, which acts in one direction only, into the matrix 5 of the rotary plate 4. The wire 1 is thus pushed into the matrix 5 until the desired length of the wire is obtained. This is station I of the rotary plate 4 for this matrix. The rotary plate 4 is now moved forward by means of the rim gear 4b driven by pinion 9, which is intermittently operated by segmented gear 10, from station I to station II, which is the first welding station. The section of copper wire having the desired length was cut from the copper wire 1 by the movement of the matrix 5 which is constructed as a counter knife past shear and guide element 31. This movement, therefore, automatically moves the matrix 5 with the wire section 1, which is copper, to the first welding tool 31a at station II. The cut piece of copper wire 1 comes to rest with its front surface at the end of the piece of wire 2, which is of silver, which has been fed into the welding tool by means of wire-pushing device 13 including a frame slidable in 13 that carries conical wire clutch 12, which acts in one direction only. The copper wire and wire 2 are then pushed back by means of the cam actuated needle attachment 18 to a distance from the matrix 5 in the direction of the arrow A (FIG. 3) until the separating surface between the copper wire 1 and the silver wire 2 lies approximately in the center of the enclosed welding chamber 17. The spring 32, which presses on the far side of the slidable conical wire clutch frame, is automatically placed under stress during the forward movement of the needle attachment 18 and thereby controls the welding pressure. This pressure can be adjusted by the nuts 33. The pressure on this spring 32 must be larger in this particular instance than the holding pressure of the welding clamp 15. The welding jaws 16 are now operated and the welding process takes place. The welding process is initiated by a switch 34 which receives its command by way of a cam 36 which is mounted on a control shaft 35. The welding process will always take place exactly with regard to the time period by means of the electronic control of the welding machine and in conjunction with the control transformer 45, whose secondary terminals are connected with the welding connections 14 of the machine. It is possible with the use of a welding control that utilizes a condenser-impulse control that the welding process with direct current can be accomplished in an accurately measured time of welding that takes only milliseconds. The silver wire 2, after the welding process is finished, is now tightly welded to the piece of wire 1, made of copper, and is now pushed into the matrix 5, by means of a cam-operated rocker arm operating on the wire-pushing device 13, until the correct total length of the wire (silver and copper) is obtained as determined by the setting of stop 13d. The piece of copper wire and a section of the wire 2 of silver, which has been butt welded to the piece of copper wire, is, then by means of a further movement of the rotary table 4, sheared off and is carried to station III, the second welding station.

A new piece of wire 1, of copper, is brought, at the same time, from station I to station II.

The sheared off, butt-welded bimetal piece 1, 2, which is now at the second welding tool at station III, is pushed by means of a cam-operated rocker arm acting on plunger 26 out of the matrix 5 in the direction of the arrow B, FIG. 3, to position the end of silver wire 3 which comes from the opposite direction through the wire-pushing device 21 with its front surface in contact with the piece of copper wire 1 at approximately the center of the enclosed welding chamber 25 of the second welding tool 41. The spring 32a, which presses on the slide 20c is, during the forward movement of the needle attachment 26, automatically placed under stress and in this manner controls the welding pressure, which is adjusted by means of nuts 33a. The pressure on this spring 32a must be larger than the holding pressure on the welding clamping piece 23 so the wire will slide through the clamping piece of the welding tool. The welding jaws 24 are now actuated and the welding process takes place in the same manner as already described above in describing the previous weld.

After this welding step is finished, the wire 3 of precious metal 3, (for instance silver) is pushed together with the solidly welded bimetal wire piece 1, 2 so far into the matrix 5, by means of the cam actuated wire-pushing device 21 until the correct total length of the wire is obtained. The bimetal wire piece 1, 2 and a portion of the precious wire piece 3 is then sheared off by means of a further movement of the rotary plate 4, and moves on now to station IV.

The station IV and station V are shown as being only transport stations. Neither welding processes now upsetting or shaping processes take place at these two stations.

Each time table 4 moves to a new station, however, a new piece of wire, for instance copper 1, is brought at the same time from station I to station II; a welded bimetal wire piece 1, 2 is carried from station II to station III, as well as a welded trimetal wire piece 1, 2, 3 is moved step by step by way of station IV and V to station VI. The preliminary upsetting as well as also the final upsetting process take place at station VI, and also the ejection of the formed and finished trimetal contact. The preliminary upsetting of the trimetal wire piece 1, 2, 3 is accomplished by means of the stamp 38. The drive of the upsetting tools includes an eccentric 40 to control a retrograde movement of the workpiece 1, 2, 3 which is pressed forward by a cam 37 that is provided with several cam surfaces which merge into one another gradually, the die 38, therefore, moves away from the advancing workpiece at a speed less than the workpiece is pressed forward to cause the end of the workpiece to be upset.

The semifinished contact which is preformed in this manner is now pressed into its final form by means of the finishing upsetting stamp 39 which is installed on the front side of the horizontal upsetting slide in a vertical construction, and this final shaping is accomplished by one single stroke. The finished trimetal contact is, subsequently, ejected from the matrix 5 by means of the forward feeding needle 30 and then falls into a prepared receiving container.

In order to convert the above apparatus from the production of trimetal contacts into the production of bimetal contacts, it is only necessary to switch off one of the two welding stations for the silver wire in which, then, no silver wire is fed. Despite this, however, it has been proven that the yield of contacts remains the same. One of the two welding stations for the silver wire will also have to be switched off for the purpose of converting from a trimetal to a bimetal "button" contact, and/or welded contacts. Further, the shaping tools have to be exchanged. It is, therefore, obvious that it is possible with the apparatus according to the invention that all types of contacts, consisting of several metals, can be produced.

We claim:

1. A machine for manufacturing trimetallic contacts having a body portion of inexpensive metal and a contact surface on each side of a more expensive metal to form the contact face, said machine including a rotatable plate positioned in a vertical plane and means driven by a constant speed rotating shaft to drive said rotatable plate intermittently stepwise to index said plate at successive work stations with dwell times between each rotating step, a plurality of tubular matrices having an end at each side of said rotatable plate defining a shear means spaced at equal distances from each other in a circle near the edge of said plate, a receiver having a vertical face contacting one face of said plate, said receiver supporting tools at at least four work stations, said work stations comprising a first work station including a first wire feed means and a counter shear wire guide against the face of said rotatable plate whereby a length of a first wire of inexpensive metal to form a body wire for the contact is measured, sheared from the wire by forward rotation of said plate to the next indexed position, and is carried forward, a second work station including a counter shear wire guide adjacent said rotatable plate, a first welding machine aligned with said wire guide, and a second wire feed means to supply a continuous length of a second wire through said first welding machine and said counter shear wire guide, and on the other side of said plate with a welding needle to position said body wire at said second work station with its end in contact with the end of said second wire in said first welding machine, means to cause a flow of electricity through said wires in said first welding machine to weld said second wire to said body wire, said second wire feed means being adapted to then push said body wire and a portion of said second wire through said counter shear wire guide into said matrix to form a bimetal workpiece upon rotation of said plate to its next indexed position, a third work station including a counter shear wire guide, a welding machine and a third wire feed, positioned on the other side of said rotatable plate from the similar elements at the second work station, and a welding needle on the other side of said rotatable plate from said second welding machine to position the end of said bimetal workpiece in contact with the end of said third wire in said second welding machine, means to cause a flow of electricity in said second welding machine for welding said third wire to said body wire, said third wire feed means being adapted to then push said bimetal workpiece and a portion of said third wire through said counter shear wire guide into said matrix to form a trimetal workpiece upon rotation of said rotatable plate to its next indexed position, and a last work station including a pushing means on one side of said plate and a die on the other side of said plate, said pushing means pressing the trimetal workpiece against said die to form said contact from said trimetal workpiece.

2. The machine of claim 1 in which said receiver is provided with a horizontal shaft on which said rotatable plate is supported and the wire feeding means for said first wire, said first welding machine and the second wire feed means and the pushing means at said last work station are all mounted on said receiver.

3. The machine of claim 2 in which said rotatable plate is provided with six matrices and in which four work stations are provided, the fourth work station being adjacent the first said work station on its side remote from said second and third work stations, all said work stations being located in the top half of said rotatable plate.

4. The machine of claim 3 in which said wire feed means for the second and third wires each comprise a cam-operated slidable frame carrying a secondary slidable frame spring-pressed in the feeding direction and carrying a wire clutch preventing movement of said wire in the direction contrary to the wire feeding direction whereby said wire can be moved to position its contact with the workpiece to be within the welding machine.

5. The machine of claim 4 in which each said welding machine is provided with an enclosed welding chamber into the approximate midlength of which the surfaces of the wires to be welded are moved for welding.

6. The machine of claim 5 in which the length of said welding chambers is approximately the diameter of the wires.

7. The machine of claim 1 in which means is provided to move said die in the same direction but at a slower speed than the advance of said pushing means.

8. The machine of claim 7 in which, following the formation of the head of the contact by pressing against the die the head means is provided including a finishing press stamp to finally finish said head prior to ejection of the contact from the machine.

9. The machine of claim 6 in which the electric current provided for welding is provided for each welding machine by its own transformer controlled by a transistorized thyristor.

10. The machine of claim 6 in which the electric current is direct current from a condenser controlled by a transistorized condenser impulse control.